United States Patent [19]

Hale et al.

[11] Patent Number: 4,652,698

[45] Date of Patent: Mar. 24, 1987

[54] METHOD AND SYSTEM FOR PROVIDING SYSTEM SECURITY IN A REMOTE TERMINAL ENVIRONMENT

[75] Inventors: William J. Hale; William R. Horst, both of Dayton, Ohio

[73] Assignee: NCR Corporation, Dayton, Ohio

[21] Appl. No.: 640,277

[22] Filed: Aug. 13, 1984

[51] Int. Cl.$^4$ .............................................. H04L 9/00
[52] U.S. Cl. ...................................... 380/24; 380/29; 380/28
[58] Field of Search .......................... 178/22.08, 22.09; 235/379, 381

[56] References Cited

U.S. PATENT DOCUMENTS

| | | | |
|---|---|---|---|
| Re. 29,057 | 11/1976 | Enikeieff et al. | 340/825.31 |
| 3,641,315 | 2/1972 | Nagata et al. | 340/825.31 |
| 3,798,605 | 3/1974 | Feistel | 178/22.09 |
| 3,846,622 | 11/1974 | Meyer | 340/825.31 |
| 3,934,122 | 1/1976 | Riccitelli | 340/825.34 |
| 4,094,462 | 6/1978 | Moschner | 235/419 |
| 4,186,871 | 2/1980 | Anderson et al. | 178/22.09 |
| 4,193,131 | 3/1980 | Lennon et al. | 178/22.09 |
| 4,264,782 | 4/1981 | Konheim | 178/22.08 |
| 4,288,659 | 9/1981 | Atalla | 178/22.08 |
| 4,295,041 | 10/1981 | Ugon | 235/488 |
| 4,317,957 | 3/1982 | Sendrow | 340/825.31 |
| 4,349,695 | 9/1982 | Morgan et al. | 178/22.08 |
| 4,357,529 | 11/1982 | Atalla | 235/381 |
| 4,438,824 | 3/1984 | Mueller-Schloer | 178/22.08 |
| 4,536,647 | 8/1985 | Atalla et al. | 178/22.08 |

*Primary Examiner*—Salvatore Cangialosi
*Assistant Examiner*—Aaron J. Lewis
*Attorney, Agent, or Firm*—Wilbert Hawk, Jr.; Albert L. Sessler, Jr.

[57] ABSTRACT

A security system and method are disclosed in a network comprised of a plurality of remote terminals in communication with a central processor wherein, before a user can access data from the central processor, that user's assigned terminal must first verify that the user is the proper user of that terminal and then the central processor must verify that the terminal requesting that data is authorized to access that data. In a preferred embodiment, a first memory in the terminal that is assigned to a particular user is initialized by storing therein a file number associated with the particular user, an assigned terminal number of the terminal, an assigned algorithm, and a first number derived from the use in the assigned algorithm of the assigned terminal number and a secret PIN number entered by the particular user into the terminal. The file number of the user and the terminal number and algorithm associated with that file number are also stored in a second memory in the central processor as another part of the initialization procedure. In a subsequent operation, a user enters his secret PIN number and a desired file number into the terminal. That current secret PIN number and the terminal number are used in the assigned algorithm to compute a second number. If the first and second numbers properly compare, the user is verified and the terminal transmits the desired file number to the central processor. In response to this desired file number, the central processor causes a random number to be generated. The terminal uses this random number and its assigned terminal number and algorithm to calculate a third number which is applied to the central processor. At the same time the central processor uses this random number and the terminal number and algorithm which are both associated with the desired file number to calculate a fourth number. If the third and fourth numbers properly compare in the central processor, the terminal is verified and access to the desired file number is allowed.

7 Claims, 7 Drawing Figures

VERIFY CORRECT USER

METHOD AND SYSTEM FOR PROVIDING SYSTEM SECURITY IN A REMOTE TERMINAL ENVIRONMENT

BACKGROUND OF THE INVENTION

1. Field of the Invention

The present invention relates to a security system in a network comprised of rerote terminals in communication with a central processor and particularly to a security system in such a network wherein any given terminal verifies that an assigned user of that terminal is authorized to use that terminal and then the central processor verifies that that terminal is authorized to access specific data or services from the central processor relative to the assigned user.

2. Description of the Prior Art

The establishment of large distributed data processing and computing systems, utilizing a large number of remote terminals has given rise to concerns relative to the security of the systems. Such security concerns particularly exist in those computing systems which require the access or exchange of substantial monetary value. Such computing systems require means whereby an individual requesting service by a system be adequately identified as being appropriately authorized to use the system before the service can be provided.

In addition to the identity of the would-be user, the determination of the range of previously authorized services appropriate to any given identified user must be performed in a consistent, secure manner.

The most common method for verifying the identity of a user in current systems of the type of interest is with the use of the so-called Personal Identity Number (PIN). Typically, the user is required to correctly enter a multi-digit number (or letter) string into the terminal keyboard. The security rests on the premise that the particular number combination of the PIN is legally known only to the specific user and the host or central computer of the system being accessed.

In one implementation the PIN is transmitted through the terminal to the host computer where the PIN is compared to the contents of a host or central file (customer or user account file), as identified by the user's account number, to verify that the PIN is correct for the assigned user number or account number assigned to the user. The user number or account number may be entered at the terminal level by some semi-automatic means such as a magnetic stripe card reader, e.g., the account number is read from the contents of the magnetic stripe on a credit card or debit card issued by many financial institutions.

If a security method of the type previously described is carefully analyzed, the following potential problems could compromise the system security.

(1) Since the PIN, when properly used by the correct user, is retained only in the user's memory and is never visually recorded, it must not contain an unreasonable number of digits or characters if the human mind is to cope with it. Over the years, many experiments (particularly by the telephone companies) tend to indicate that the human mind cannot accurately retain more than about seven random digits at one time. In practice, PINs are generally four or five digits in length.

(2) Once the PIN is entered into the terminal, it must be transmitted along with the account number to the host computer before it can be verified. Less secure systems may transmit the PIN over the communication network in a non-encoded or non-encrypted form, i.e., in so-called "clear-text". Somewhat more secure systems would encrypt the PIN before it is transmitted to the host computer. However, a criminal can fraudulently connect (tap) to the communication line. Even if that criminal is unable to determine the exact number (character) string of a specific PIN itself, he could become aware that a specific coded combination of digits appearing on the communication line always results in a PIN input message being accepted by the host computer. In that event, any time that that criminal re-duplicates the coded combination of digits by various fraudulent means, he would be able to enjoy the "rewards" of any following instruction, such as "issue cash".

(3) Looking broadly at the total system, messages containing a PIN may pass through one or more local units, such as a local communication network controller or local processor, before being encrypted and placed on a communication line for transmission to the distant host computer, where the account files reside and the PIN can be verified. It is possible that a knowledgeable criminal can gain access to the cables connected to the local controller or to the memory of the local processor and thereby successfully obtain valid, pre-encrypted PINs or inject fraudulent, but profitable, messages into the system. It is also possible that a knowledgeable person could obtain a listing of PIN numbers and associated accounts from the host computer for fraudulent use.

The background art known to the applicants at the time of the filing of this application is as follows:

U.S. Pat. No. 3,641,315, System For Automatically Conducting Office Work Required for Transactions At a Bank and the Like, by M. Nagata et al.;

U.S. Pat. No. 3,846,622, Access Control Apparatus, by M. R. Meyer;

U.S. Pat. No. 3,934,122, Electronic Security Card and System for Authenticating Card Ownership, by J. A. Riccitelli;

U.S. Pat. No. 4,094,462, Method and Means for Providing and Testing Secure Identification Data, by J. L. Moschner;

U.S. Pat. No. 4,295,041, Device for the Protection of Access to a Permanent Memory of a Portable Data Carrier, by M. Ugon;

U.S. Pat. No. 4,317,957, System for Authenticating Users and Devices in On-Line Transaction Networks, by M. Sendrow;

U.S. Pat. No. 4,357,529, Multilevel Security Apparatus and Method, by M. M. Atalla; and U.S. Pat. No. Re. 29,057, Electronic Identification System Employing a Data Bearing Identification Card, by O. C. Enikeieff et al.

SUMMARY OF THE INVENTION

Briefly a security method and security system are provided in a network comprised of remote terminals in communication with a central processor wherein any given terminal verifies a user of that terminal before the central processor verifies that terminal.

In accordance with one aspect of the invention, there is provided a security system comprising, in combination, means responsive to the entry therein of a personal identification number by a user for determining whether that user is authorized to use said determining means; and means responsive to a request from said determining means for information from a particular information file for verifying whether or not said determining means is authorized to obtain information from that particular information file. In accordance with another aspect of the invention, there is provided a method for accessing a security system comprised of a remote terminal and a central processor, said method comprising the steps of: verifying that a particular user entering his personal identification number in the remote terminal is authorized to use that remote terminal; and verifying that that remote terminal requesting information on a particular file in the central processor is authorized to access that particular file for information.

It is therefore an object of this invention to provide an improved system and method for establishing increased system security in the communication between a remote terminal and a central processor.

Another object of this invention is to provide a method and system for establishing security in a network comprised of remote terminals in communication with a central processor wherein any given terminal verifies a user of that terminal before the central processor verifies that terminal.

Another object of this invention is to provide a method and system for preventing a person from fraudulently obtaining and using information being transmitted from a remote terminal to a central processor to further his own criminal objectives.

A further object of this invention is to provide a method and system for the secure utilization of PINs and the transmission of PIN-related information from a remote terminal to a central processor for access to secure, monetary accounts and other secure information.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
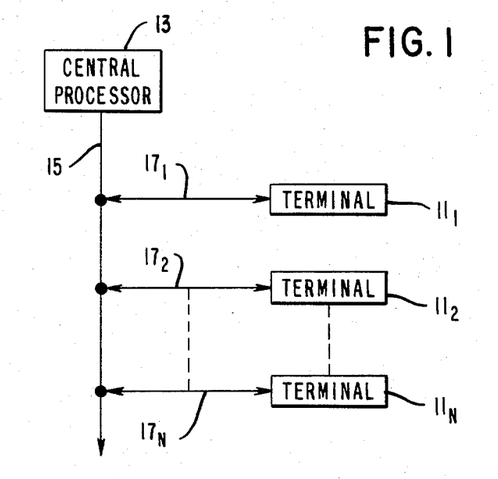
FIG. 1 is a schematic block diagram of a plurality of remote terminals coupled to a central processor by way of a common transmission medium.

Referring now to the drawings, FIG. 1 shows a system or network comprised of a plurality of remote terminals $11_1, 11_2 \ldots 11_N$ coupled to a central processor 13 by way of a two-way transmission medium 15, such as a telephone line, a coaxial cable, a communication link through the air, a fiber optic cable or some other suitable means or combination thereof. In a preferred embodiment, the transmission medium 15 is a telephone line and the remote terminals $11_1, 11_2 \ldots 11_N$ are respectively coupled to that transmission medium or telephone line 15 by associated two-wire connections $17_1, 17_2 \ldots 17_N$ for two-way data communications between the terminals $11_1, 11_2 \ldots 11_N$ and the central processor 13. In the network of FIG. 1, any of the terminals $11_1, 11_2 \ldots 11_N$ can transmit associated predetermined information to the central processor 13 to request access to secure monetary accounts and other secure file information. If that predetermined information is correct, access is granted by the central processor to the requested secure file information.

In current and prior practice, the cost of terminals (such as the terminals $11_1, 11_2 \ldots 11_N$) and associated intermediate units (not shown), when used between the respective terminals and the central processor 13, was of a magnitude that necessitated that each terminal be shared among multiple users to minimize the cost or investment for each user. Much of the current practice, as described above, grew out of this shared terminal environment. For example, since the terminal was employed by multiple users and since a user could generally use any one of several different terminals, the system or network did not attempt to maintain user verifying information at the terminal level but, instead, retained this information at the central processor 13.

Figures 2, 7:
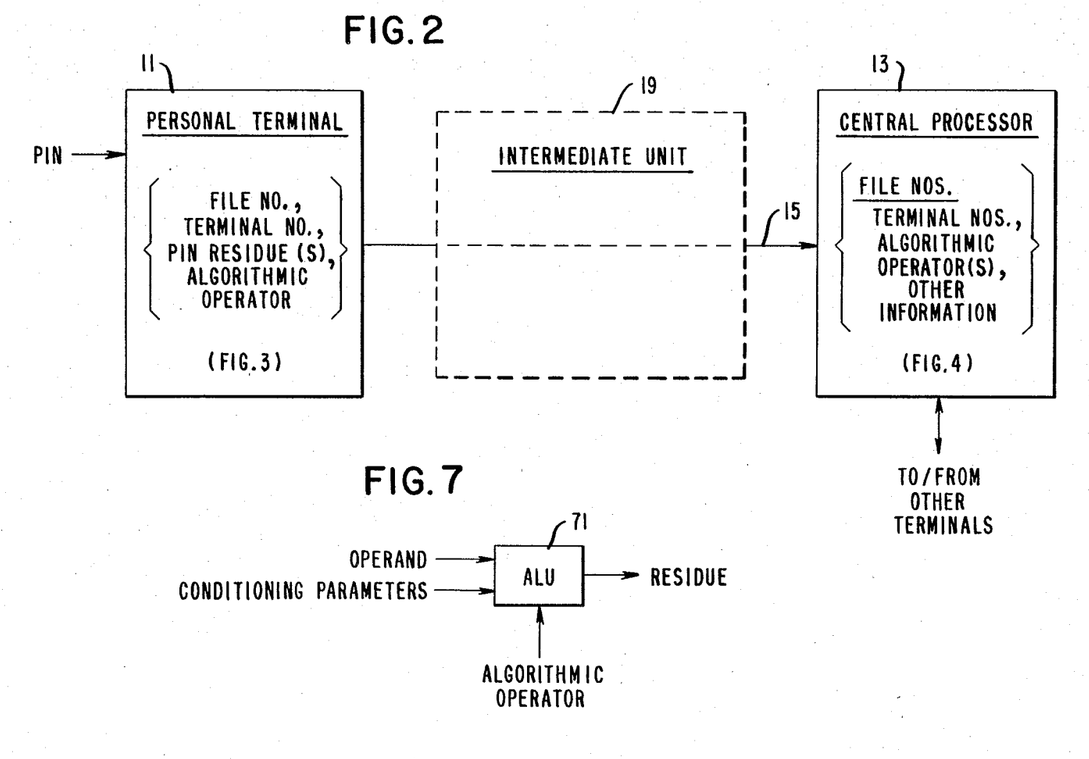
FIG. 2 is a schematic block diagram of a preferred embodiment of the invention.
FIG. 7 illustrates general inputs to an arithmetic logic unit (ALU) that are useful in explaining an exemplary algorithm that may be used to calculate a residue.

With the advance of technology, the cost of each terminal has been substantially reduced such that it has become economically feasible to provide a specific personal terminal to each user. In addition, the intelligence level or decision-making capability of a terminal can now be increased to the level where it is practical to verify the PIN at the terminal if the range of users of that terminal is very limited, e.g., husband and wife. As a consequence of such a change in the environment of terminal usage, it naturally follows that new methods and techniques for system security are required. The preferred embodiment of the invention shown in FIG. 2 illustrates such a novel technique for providing system security in this new remote terminal environment.

For ease of understanding the following description in relation to FIG. 2 and FIGS. 3-7, the following terms will be defined at this time.

Personal Terminal: A unit in the overall system, typically with a keyboard and a display, that serves as the interface between the user and the remainder of the system by communicating directly or indirectly to the central processor of the system.

User: The person or customer desiring information or service from the system.

Intermediate Unit: A unit in the overall system that may or may not exist in any given system between a personal terminal and the central processor. When used in the system, the messages from the personal terminal pass through an associated intermediate unit prior to reaching the central processor.

Transmission Medium: The means whereby the information from a personal terminal or associated intermediate unit is transmitted to the central processor. Typically, the transmission medium is a narrow or wideband telephone line, a coaxial cable, a satellite link, a fiber optic cable or any other suitable means.

Central Processor: The controlling unit at one end of the transmission medium which has access to each user's secure file information or to each user's account file containing such information as account balances, security information and history files. It should be apparent to those skilled in the art that the term "central processor" represents a wide range of facilities, such as front-end-processors, file processors, disk memories, communication controllers and so forth.

Personal Identification Number (PIN): The unique, secret number or alphanumeric combination assigned to or chosen by each user and known only to the user.

File Number (User Number or Account Number): A different multi-digit number assigned to each user or customer of the system for each information file or account of that user. The file number is specific to a particular user, but is not secret and is possibly known to other individuals both within and outside of the system.

Terminal Number: A multi-digit number stored permanently in a user's personal terminal, either at the time of manufacture of the personal terminal or at the time that the personal terminal is issued to a particular user. This terminal number is unique from personal terminal to personal terminal, with no two personal terminals having the same terminal number. In addition, this unique terminal number is not accessible to the terminal user and does not ever appear at the output of the personal terminal.

Random Number: A multi-digit number generated by the central processor in such a manner that the numerical value of the number is random from one generation of the number to the next.

Algorithmic Operator: A mathematical operation or algorithm performed in the personal terminal and in the central processor. The algorithmic operator requires as inputs an operand and conditioning parameters. The output of the algorithmic operator is the residue, which can be expressed mathematically as:

Residue=Algorithmic Operator operating on the Operand and Conditioning Parameters.

The particular algorithmic operator for a particular personal terminal is stored both in that personal terminal and in the central processor. The personal terminals in a given system can all use the same algorithmic operator, all use different algorithmic operators for additional security, or some personal terminals can use the same algorithmic operator while other personal terminals can use different algorithmic operators.

Operand: One of the two input number strings required by the algorithmic operator. For illustrative purposes, in this application the PIN will be the operand for a personal terminal, while a random number will be the operand for the central processor.

Conditioning Parameters: The remaining one of the two input number strings required by the algorithmic operator. For illustrative purposes, in this application the terminal number stored in a personal terminal will be the conditioning parameters for that personal terminal, while that same terminal number stored in the central processor will be used as the conditioning parameters for the central processor when verifying that particular personal terminal.

Residue: The output resulting from the use of the algorithmic operator on the associated operand and conditioning parameters. Three residues will be utilized in this application, e.g., a "PIN residue", a "terminal residue" and a "processor residue".

Referring now to FIG. 2, a schematic block diagram of a preferred embodiment of the system of the invention is shown. As shown in FIG. 2, a personal terminal 11 is coupled to the central processor 13 by way of the transmission medium 15 which as stated before can be, for example, a telephone line. When the personal terminal 11 is located at a fixed site, such as a user's home, it can be directly coupled by way of a connection (not shown), such as one of the connections $17_1$, $17_2$ ... $17_N$ (FIG. 1), and the telephone line 15 to the central processor 13. When the personal terminal 11 is utilized as a portable unit, it can be electrically or optically coupled to an intermediate unit 19 located at a fixed site such as, for example, a business store, a financial institution or a security or military installation so that two-way communications between the personal terminal 11 and the central processor 13 can take place from that fixed site.

Figure 3:
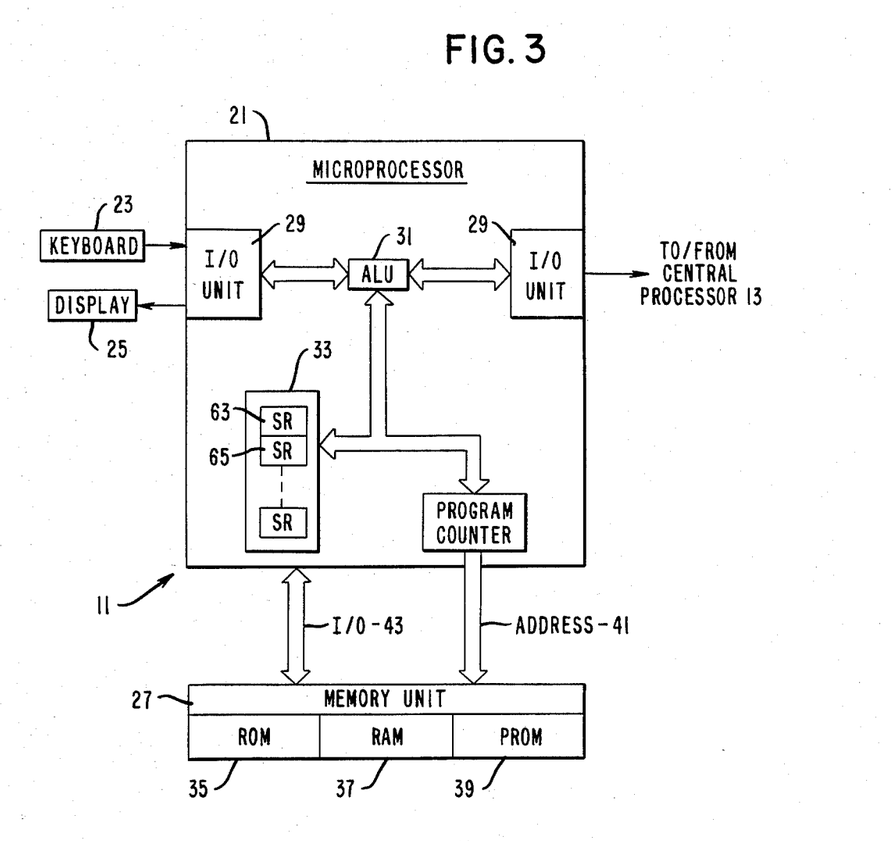
FIG. 3 is a simplified schematic block diagram of one of the personal terminals of FIGS. 1 and 2.

Whether the personal terminal is located at a fixed site or is utilized as a portable unit which can be coupled to an intermediate unit 19, two basic tasks must be performed each time that the user wishes to employ his personal terminal 11 to access information or services from the central processor 13. First, the personal terminal 11 must verify that the user is the rightful user of that personal terminal 11. In other words the terminal 11 must verify that the correct, rightful user is depressing keys on the terminal keyboard (FIG. 3). Second, the central processor 13 must verify that the instrument sending the request for information or service is the specific terminal 11 associated with the specific file number that is authorized to access the requested information or service.

Before proceeding with the description of the system of FIG. 2, reference will now be made to FIGS. 3 and 4.

FIG. 3 illustrates a simplified schematic block diagram of the personal terminal 11. Essentially, the personal terminal 11 may be comprised of a microprocessor 21, a keyboard 23, a display 25 and a memory unit 27.

Microprocessor 21, which, for example, can be an Intel 8085 microprocessor and associated interfacing circuitry, contains an input/output (I/O) unit 29 coupled to the keyboard 23, display 25 and to the central processor 13 via transmission medium 15 (FIG. 2), an arithmetic logic unit (ALU) 31 and a bank of shift registers 33.

Memory unit 27 contains a ROM (read only memory) 35 for storing a software program for the personal terminal 11, a RAM (random access memory) 37 for providing a temporary memory storage and a nonvolatile PROM (programmable read only memory) 39 for permanently storing information only relative to the personal terminal 11. The ROM 35, RAM 37 and PROM 39 are selectively addressed via an address bus 41 to provide information requested by the microprocessor 21 to the microprocessor 21 via I/O bus 43.

Figure 4:
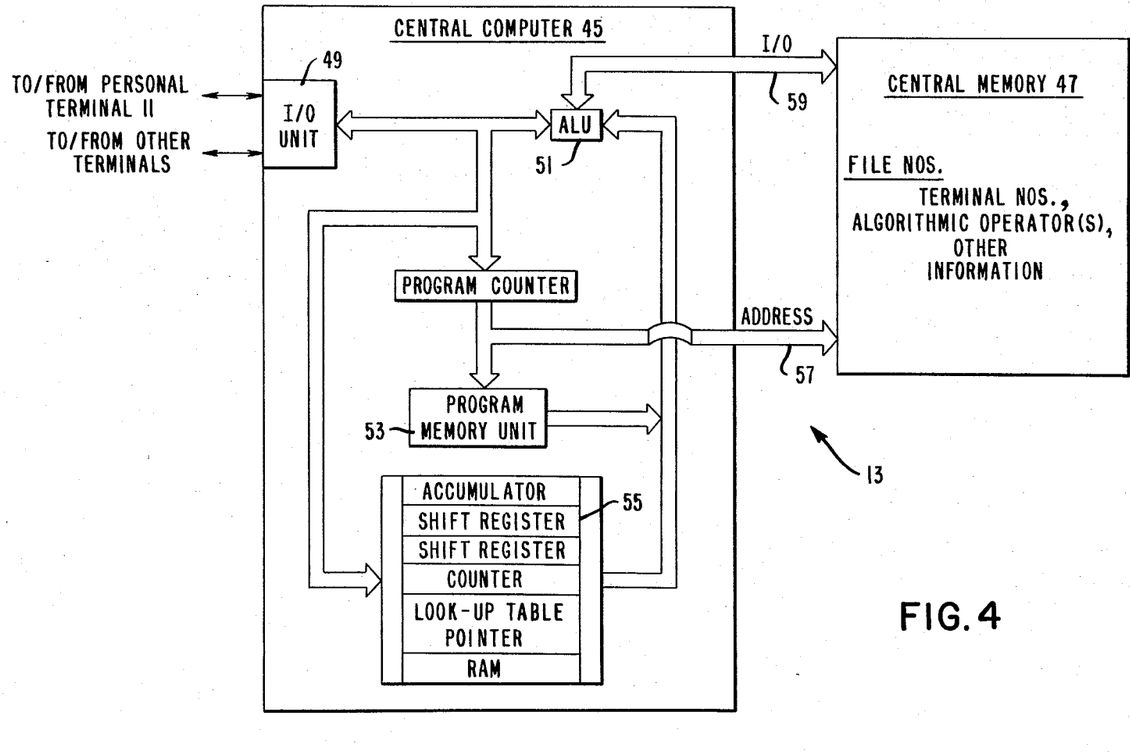
FIG. 4 is a simplified schematic block diagram of the central processor of FIGS. 1 and 2.

FIG. 4 illustrates a simplified schematic block diagram of the central processor 13. Essentially, the central processor 13 may be comprised of a central computer 45 and a central memory 47.

Central computer 45, which can be exemplified by a mainframe processor such as the NCR 8600, a minicomputer such as the NCR 9300, or a microcomputer system such as the NCR Tower, contains, in general form, an I/O unit 49 coupled to the personal terminal 11, as well as to the remaining other personal terminals $11_1$, $11_2$ ... $11_N$ in the system, via transmission medium 15 (FIG. 2), an arithmetic logic unit (ALU) 51, a program memory unit 53 and a bank of shift registers 55.

Central memory 47 has a large memory storage capacity and can be, for example, a disk memory. This memory 47 contains the file numbers of all of the users of the personal terminals $11_1, 11_2 \ldots 11_N$ (FIG. 1) in the system. It should be recalled that a personal terminal can have one, or more, file numbers associated with the particular user of that terminal. Associated with each file number in the memory 47 is the terminal number, algorithmic operator and other user-oriented information pertinent to the user of the specific one of the personal terminals $11_1, 11_2 \ldots 11_N$ that is associated with that file number.

The central memory 47 contains many useroriented files, with a user's file number operating as an address to locate the user's file in the memory 47. Memory 47 is addressed by a file number applied (in a generic sense) via an address bus 57 to provide information requested by the central computer 45 from the addressed file to the central computer 45 via I/O bus 59.

Referring back to FIG. 2, at the time that the terminal 11 is initially assigned to a user, the following initialization sequence of steps must be completed to initialize that terminal 11.

When a user wishes to open a specific file or account, that user is assigned a file number for that specific file or account. This file number is recorded in the non-volatile memory or PROM 39 (FIG. 3) of the personal terminal 11. In addition, this file number and other user-related information, such as economic and demographic information, are stored in the central memory 47 (FIG. 4) of the central processor 13.

If a terminal number for the terminal 11 has not been permanently recorded in the terminal 11 at the time of its manufacture, then a terminal number is permanently recorded in the PROM 39 (FIG. 3) of the terminal 11. That same terminal number for the terminal 11 is stored in the central memory 47 (FIG. 4) along with the previously stored associated file number for the terminal 11.

The user selects or is assigned a personal identification number (PIN) unique to that specific user. The user then enters that PIN on the keyboard 23 (FIG. 3) of the terminal 11. Terminal 11 calculates the initial PIN residue for the terminal 11 via the algorithmic operator permanently stored in the terminal 11, using the PIN as the input operand and the terminal number of terminal 11 as the conditioning parameters. The initial PIN residue for the terminal 11 is also stored in the PROM 39 (FIG. 3) of that terminal. Once the PIN residue is permanently stored in the PROM 39 (FIG. 3), the terminal 11 is initialized for the specific user and will not step through the initialization sequence again.

If the user decides to open more than one file or account, either at the current time or in the future, each additional file number is also stored in the terminal 11 and in the central memory 47 (FIG. 4) of the central processor 13. The same PIN is used with each additional file number, and the associated PIN residue for each file number remains securely in the terminal 11. However, the PIN itself does not reside in the terminal 11. It exists only in the head of the user.

Typically, the algorithmic operator stored in the terminal 11 would be the same in all of the other terminals $11_1, 11_2 \ldots 11_N$ (FIG. 1) in a given system. This same algorithmic operator is also used by the central memory 47 (FIG. 4) of the central processor 13. The specific form of the algorithmic operator, per se, is not considered to be a critical element of the system security, since it can be known by multiple individuals (and users) associated with the system without compromising the system security. The elements that are considered critical to security are the specific PIN (that is selected or assigned to a user) and the specific terminal number that are recorded in a terminal and in the central memory 47 (FIG. 4). The user of a terminal is not aware of the terminal number of his assigned terminal, nor does he have any way to access it. Furthermore, which specific terminal number is associated with which specific file number or numbers is another critical element of the system security. This is due to the fact that file numbers are not secret, whereas terminal numbers are secret. Consequently, the central memory 47 (FIG. 4) which contains the listings of file numbers and associated terminal numbers must be maintained in a highly confidential and secure manner at the central processor 13.

Since, as stated before, the unique terminal number and the PIN residue for a user's terminal must remain permanently in the associated PROM 39 (FIG. 3) of that terminal, various ways in which the terminal number and PIN residue can be permanently stored in a ROM such as the PROM 39 will now be discussed.

Whether it is decided to fabricate the terminal number into the terminal at the time of manufacture or by a dedicated special purpose terminal at the time of its issue to a user, one way for storing that terminal number is by use of a so-called "fused link" ROM whereby the terminal number is represented by "blown junctions" of a diode/transistor array. Another possibility is a "write-once" memory such as a UVPROM (ultra violet PROM) with the normal window not provided so that erasure or alteration is not possible. These and other methods well known in the current state of the art are possible selections for the PROM 39 (FIG. 3) of a terminal.

Since the PIN residue must be permanently recorded in a user's terminal after the user has selected (or been assigned) his PIN, there must be a way provided to permanently record the PIN residue at the time of issue of the user's terminal. For this reason, and to increase the level of control over the terminal number, the preferred choice would be to record both the terminal number and the PIN residue in the terminal at the time of issue of that terminal. The previously discussed "fused link" ROM and "write-once" memory are two of several permanent memories that could be used for this purpose.

It should be noted that if the same algorithmic operator is stored in all of the terminals $11_1, 11_2 \ldots 11_N$ (FIG. 1), then that algorithmic operator can be stored in the ROM 35 (FIG. 3) of the terminal 11 as part of the software program in the ROM 35. If, for purposes of increased security, the same algorithmic operator is not stored in all of the terminals $11_1, 11_2 \ldots 11_N$ (FIG. 1), then the algorithmic operator for terminal 11 (as well as each of the remaining terminals) can also be permanently stored in the associated PROM 39 (FIG. 3) of that terminal in a manner similar to that previously described for the terminal number and PIN residue.

Thus, the terminal number and PIN residue (and algorithmic operator when additional security is needed) of a terminal are not accessible external to the terminal. In addition, the terminal number is forwarded by secure means to the central processor 13 for storage in the central memory 47 (FIG. 4) with the associated file number. Such secure means is, for example, by courier and never by way of the transmission medium 15

(FIG. 1), unless highly secure encryption techniques for block data transmission are utilized.

Once the terminal is initialized and assigned to a specific user, and the file number and terminal number reside securely in the central memory 47 (FIG. 4) of the central processor 13, the terminal can be employed by the user to communicate with the central processor 13 to gain access to information or service therefrom. It was previously stated that, before a user can employ his terminal to access information or service from the central processor 13, the user must first be verified by his terminal and then the terminal of that user must be verified by the central processor 13. A user verification is a determination by his terminal that he is the rightful user of that terminal. A terminal verification is a determination by the central processor 13 that the terminal originating the request for information or service is associated with the specific user file number and therefore is authorized to access the requested information or service. These two types of verification will now be discussed in more detail by referring to FIGS. 5 and 6.

Figure 5:
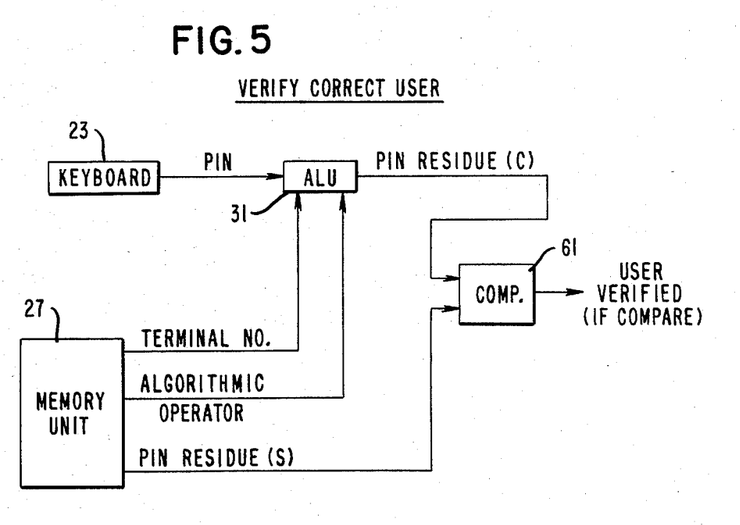
FIG. 5 is a functional block diagram illustrating how a personal terminal verifies the correct user of that terminal.

FIG. 5 is a functional block diagram illustrating how the personal terminal 11 (FIG. 3) verifies the correct user of that terminal 11. FIG. 3 will be used in conjunction with FIG. 5 to explain the operation of FIG. 5.

Initially the user activates the terminal 11 and identifies the information or service that he wants from the central processor 13 (FIG. 1). The software program in the ROM 35 is then executed by the microprocessor 21, causing the following operations to be performed.

A message is sent through the I/O unit 29 to the display 25 requesting that the user enter his unique PIN on the terminal keyboard 23. The PIN from the keyboard 23 and the terminal number and algorithmic operator accessed from the memory unit 27 are applied to the arithmetic logic unit (ALU) 31. The ALU 31 employs the algorithmic operator, using the just entered PIN as the operand and the terminal number as the conditioning parameters, to calculate the PIN residue (C), where the (C) indicates that this is the PIN residue calculated from the just entered (or currently entered) PIN.

The terminal internally compares the calculated PIN residue (C) with the stored PIN residue (S), where the (S) indicates that this is the stored PIN residue calculated when the terminal was originally initialized. In a hardware comparison, the comparison would be made in a comparator 61. In a software comparison, the PIN residue (C) and PIN residue (S) would be respectively stored in registers 63 and 65 of the bank of shift registers 33 and then corresponding bit positions in the registers 63 and 65 would be clocked out and sequentially compared for correspondence, pursuant to a subroutine of the main program in the ROM 35.

If the calculated PIN residue (C) is the same as, or compares with, the stored PIN residue (S), the user is verified by his terminal 11. In this case the software accordingly notifies the user via the I/O unit 29 and display 25, and then the terminal 11 proceeds with the transaction being requested by the user. However, if the calculated PIN residue (C) does not exactly compare with the stored PIN residue (S), the user is requested to re-enter his PIN. If, after several repeated PIN entries, no successful compare occurs, the terminal 11 no longer responds to entries into the keyboard 23 and must be reactivated by the source (not shown) which originally issued the terminal 11 to the user.

Figure 6:
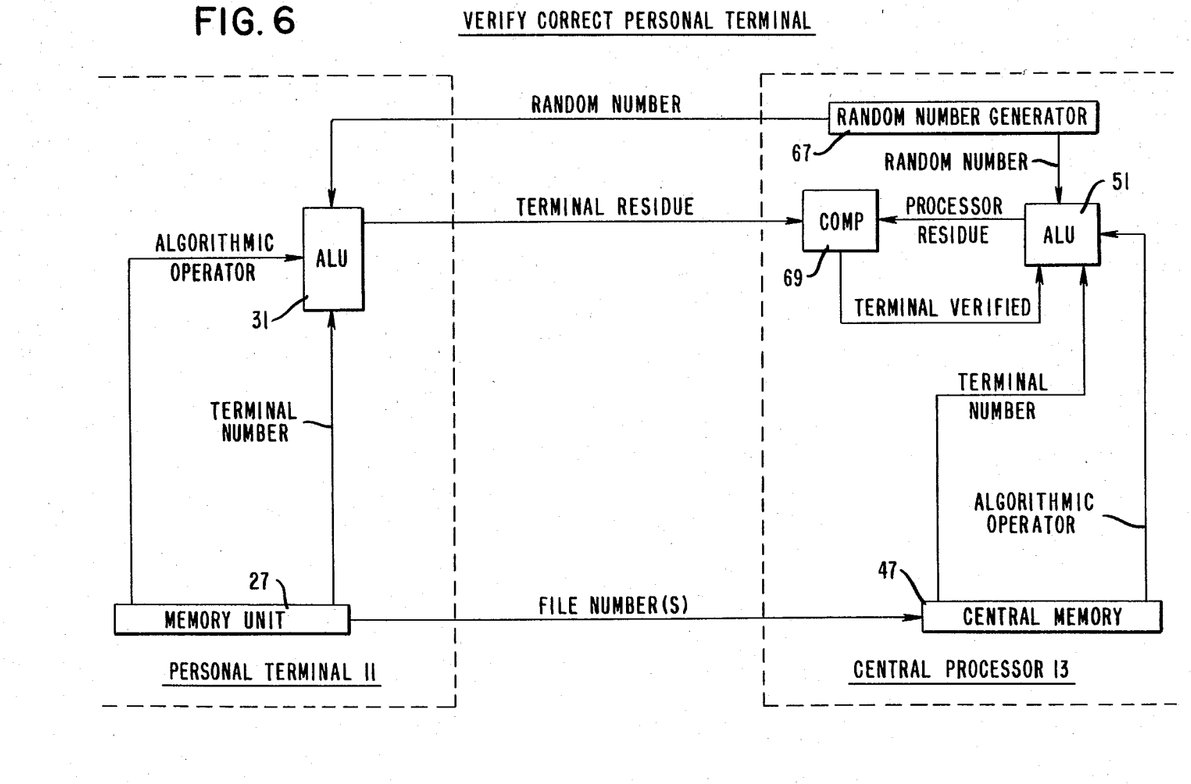
FIG. 6 is a functional block diagram illustrating how the central processor verifies the correct personal terminal desiring to access a particular file in the central processor.

FIG. 6 is a functional block diagram illustrating how the central processor 13 verifies the correct personal terminal 11 that desires to access a particular file in the central memory 47 of the central processor 13. FIGS. 3 and 4 will be used in conjunction with FIG. 6 to explain the operation of FIG. 6.

After a successful comparison of the PIN residue (S) and PIN residue (C) has occurred in the terminal 11 (i.e., the terminal 11 has verified that the correct user is operating the terminal 11 as shown in FIG. 5), the terminal 11 causes the file number(s) upon which information or service is to be performed, to be transmitted via the transmission medium 15 (FIG. 1) to the central memory 47 in the central processor 13. The central processor 13 must next verify that the requested information or service relative to the specified file number(s) is being received from a bona fide terminal and a specific terminal which is authorized to access such information or services from the specified file number(s). Such terminal verification is accomplished in the following manner.

A file number applied to the central memory 47 operates as an address, causing the central memory 47 to supply the terminal number and algorithmic operator that are associated with that file number to the arithmetic logic unit (ALU) 51. Also, in response to the input file number, the software in the program memory unit 53 (FIG. 4) causes a random number generator 67 to generate a multi-digit random number and apply that random number to the ALU 51 in the central processor 13 and to the ALU 31 of the personal terminal 11 requesting the information or service (via the transmission medium 15 of FIG. 1).

The ALU 51 calculates a processor residue using the algorithmic operator from the central memory 47, with the random number from the generator 67 as the operand and the terminal number from the central memory 47 as the conditioning parameters. At the same time, the personal terminal 11, upon receiving the random number from the random number generator 67 in the central processor 13, calculates a terminal residue using the algorithmic operator from the memory unit 27, with the random number as the operand and the terminal number from the memory unit 27 as the conditioning parameters. The terminal residue is transmitted from the terminal 11 to the central processor 13 via the transmission medium 15 (FIG. 1).

Upon receiving the terminal residue, the central processor 13 internally compares the terminal residue from the terminal 11 with the processor residue. In a hardware comparison, the comparison of the terminal and processor residues would be made in a comparator 69. In a software operation, the generation of the random number, the computation of the processor residue and the comparison of the terminal residue with the processor residue would be respectively accomplished by associated subroutines in the main software program stored in the program memory unit 53 (FIG. 4) in the central processor 13.

A correct comparison of the terminal residue with the processor residue indicates that the terminal 11 requesting information or service from a file associated with a specific file number is the valid personal terminal to have access to that file. In other words a correct comparison verifies that the personal terminal 11 is the correct personal terminal to access that file (and, since the user has been previously verified by the terminal 11, that the user operating the keyboard 23 of the personal terminal 11 is the rightful holder of that file). A non-comparison of the terminal residue and processor residue results in the request by terminal 11 for information or service from that file being refused. In addition, a notation is made in the file associated with the specific file number transmitted from the terminal 11 that an unaccepted request for information or service was made against that specific file number.

If the terminal residue does correctly compare with the processor residue, the comparator 69 sends a TERMINAL VERIFIED signal to the ALU 51 to enable the central processor 13 to proceed. The central processor 13 then proceeds in a normal internally-programmed fashion to provide the information or services requested by the terminal 11 and the user's requested transaction proceeds.

The reason that the central processor 13 generates a random number for each transaction and sends it to an information-or service-requesting terminal to calculate a terminal residue is so that the response (i.e., the terminal residue) from the terminal will be different for each transaction. A would-be criminal monitoring the transmission medium 15 (FIG. 1) and attempting to "spoof" or fool the system by generating a fraudulent message in an attempt to appear to the central processor 13 as a legitimate terminal will fail in his attempt to do so. Such failure would be due to the fact that if he merely repeated the previous terminal residue, it would be rejected since the random number generated for the current transaction is different than the random number used during the previous transaction. Similarly, the criminal is not able to generate the correct response (i.e., the terminal residue) because, even if he knows the system's (or the terminal's) algorithmic operator and is able to recover the random number sent from the central processor 13 to the terminal for the current transaction, he is unable to calculate the correct terminal residue because he does not know the terminal number of the terminal that is generating the current request for information or service. As stated before, the terminal number, per se, is never transmitted during the transaction, but resides only in the terminal and in the central memory 47 of the central processor 13. This terminal number can be of any chosen length and can contain any selected level of internal "check digits" or positional relationships between the numeric or alphanumeric characters of that terminal number. The probability that the would-be criminal could choose a combination of characters that would be the same as the correct terminal number, and could therefore be used in the algorithmic operator to generate the correct terminal residue, can be made essentially zero.

To reiterate, as described in relation to FIGS. 5 and 6, it is the function of a personal terminal to verify the correct identity of the user of that terminal by means of the PIN, while it is the function of the central processor 13 to verify that the personal terminal requesting information or service is the valid terminal to access the specific file number(s) being requested for information or service.

It should be particularly noted that the two-step system security being described is end-to-end security, i.e., from a terminal to a requested file in the central processor 13. The method and system described for this end-to-end security system does not preclude, and in fact would be enhanced, by the addition of the more conventional security techniques usually employed in an on-line, real time communication network. For example, the messages flowing over the transmission medium 15 (FIG. 1) from a terminal 11 to the central processor 13, or from an intermediate unit 19 (FIG. 2) to the central processor 13, can be encrypted by numerous methods. The National Bureau of Standards Data Encryption Standard (NBS DES) might well be used to encrypt the data being transmitted to and from the terminal 11 or associated intermediate unit 19 to the central processor 13. The use of the NBS DES (or any other communication line or transmission medium 15 (FIG. 1) encryption scheme) does not replace the need for the method and system for system security described in this application, because the encryption of the transmission medium 15 (FIG. 1) protects only the security of the data being transmitted over the transmission medium 15. It insures nothing about the validity or verification of the user who is pressing keys on the keyboard 23 (FIG. 3) of the personal terminal 11 or of the validity or verification of the terminal 11 itself to request and receive information or service relative to one or more specific file numbers.

Referring now to FIG. 7, general inputs to an arithmetic logic unit (ALU) 71 are shown that are useful in explaining an exemplary algorithm that may be used to calculate a residue. These inputs are, more specifically, the previously discussed and defined algorithmic operator, operand and conditioning parameters.

As described before, these general inputs are used to calculate the PIN residue, the terminal residue and the processor residue. For example, the same algorithmic operator, or algorithm, is used in conjunction with the associated operand and conditioning parameters to compute the PIN residue, the terminal residue and the processor residue in relation to a given personal terminal. In the computation of the PIN residue, the algorithmic operator in the terminal uses the user-entered PIN as the operand and the terminal number of that terminal as the conditioning parameters. In the computation of the terminal residue, the algorithmic operator in the terminal uses the random number from the central processor 13 as the operand and the terminal number of that terminal as the conditioning parameters. In the computation of the processor residue, the algorithmic operator in the central processor 13 uses the same random number that is simultaneously being used in the terminal being tested for verification as the operand and uses the terminal number of that same terminal (assuming that the central memory 47 was able to correctly provide this number in response to the file number which was provided) as the conditioning parameters.

In the following explanation, the exemplary values of the algorithmic operator, operand and conditioning parameters have been chosen to be purposely simple in order to provide a simple illustration which is relatively easy to understand. However, it should be realized that in a practical system in accordance with the method and system of the invention, the algorithmic operator, operand and conditioning parameters would be chosen to be much more complex and involved.

In FIG. 7, let:
operand = ABCD
conditioning parameters = WXYZ
algorithmic operator = (A)[L](W)[M](B)[N](X-)[O](C)[P](Y)[Q](D)[R](Z),
where:
    L, M, ... R are any combination of arithmetic or logical operations, such as addition, subtraction, multiplication, division, shift right, shift left, exponentiation and transposition; and the operand and conditioning parameters can be in any selected number base, such as binary, hexadecimal and decimal.

For ease of calculation, and to provide a specific simple example, let:
A=3, B=2, C=1 and D=4; and
W=2, X=4, Y=3 and Z=1, all expressed in base 10.
To specify example operations, let:
[L]=TRUNCATION,
[M]=SHIFT RIGHT,
[N]=EXPONENTIATION,
[O]=DIVISION,
[P]=SHIFT LEFT,
[Q]=MULTIPLICATION, and
[R]=ADDITION By substituting the above values and operations in the above-defined algorithmic operator, the following relationships exist in the rewritten algorithmic operator:

Algorithmic operator (rewritten)=(3)[L](2)[M](2)[N](4)[O](1)[P](3)[Q](4)[R](1),

A sample calculation of a residue by using the values and operations indicated in the above rewritten algorithmic operator is as follows:

---
(4) [ADDITION] (1)=5
(3) [MULTIPLICATION] (5)=15
(1) [SHIFT LEFT] (15)=51
(4) [DIVISION] (51)=12.75
(2) [EXPONENTIATION] (12.75)=162.5625
(2) [SHIFT RIGHT] (162.5625)=25162.56
(3) [TRUNCATION] (25162.56)=2516
RESIDUE = 2516
---

The invention thus provides a system and method for establishing increased security in a network comprised of remote personal terminals in communication with a central processor, wherein it is a function of each personal terminal to verify the correct identity of the user of that terminal and it is a function of the central processor to verify that the personal terminal requesting information or service is the valid terminal to access the specific file number(s) being requested for information or service.

While the salient features of the invention have been illustrated and described, it should be readily apparent to those skilled in the art that many changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

We claim:

1. In a communication network comprised of a central processor, a plurality of remote terminals, and communication means for operationally coupling said central processor and said plurality of remote terminals, a security system for verifying both that a user of an assigned one of said remote terminals is the correct user of said assigned remote terminal and that said assigned remote terminal requesting access to a particular data file in the central processor is the correct terminal to access that data file, wherein each said remote terminal includes:

(a) means for enabling an assigned user to enter an associated PIN number;
(b) first memory means for storing a file number for a said data file associated with the assigned user of said remote terminal, a terminal number assigned to said remote terminal, an assigned algorithm and a first residue previously derived from said algorithm, said terminal number of said remote terminal, and the PIN number presented by the assigned user; and
(c) first processor means responsive to the algorithm and terminal number stored in said first memory means and to a PIN number entered by a user for generating a second residue and also for comparing said second residue with said stored first residue and upon correspondence therebetween causing a file number for a requested data file to be outputted; and wherein said central processor includes:
(a) second memory means for storing the file numbers respectively associated with said remote terminals and the specific algorithm and terminal number associated with each said file number, said second memory means being responsive to a file number from one of said remote terminals for outputting both the specific algorithm and terminal number associated with said file number; and
(b) second processor means responsive to said file number for causing a random number to be generated, and being further responsive to said specific algorithm, said remote terminal number from said second memory means, and said random number for generating a third residue;

said first processor means being responsive to said random number received from said central processor and to said algorithm and terminal number stored in said first memory means for generating a fourth residue;

said second processor means also including comparing means for comparing said fourth residue received from said first processor means of said remote terminal with said third residue from said second processor means and upon a correspondence therebetween, said second processor means enabling said remote terminal from which said file number was outputted to said central processor to gain access to the particular said data file associated with said file number; and said terminal number being inaccessible to said assigned user, and said terminal number never appearing on said communication means.

2. The security system of claim 1 wherein said first memory means includes:
a programmable read only memory for permanently storing the file number of the assigned user, the terminal number assigned to said remote terminal, the assigned algorithm, and the first residue; a read only memory for storing a software program used in the operation of said first processor means; and a random access memory for temporarily storing data during the operation of said first processor means.

3. The security system of claim 1 wherein said first processor means is a microprocessor.

4. The security system of claim 1 wherein said second memory is a disk memory.

5. A method for accessing data from a security system comprised of a central processor operationally coupled to a plurality of remote terminals, said method comprising the steps of:
- initializing each terminal by storing in that terminal a file number assigned to a particular user, a preselected algorithm and a terminal number assigned to that terminal, and a first number derived from the use of the algorithm and terminal number assigned to that terminal and of the particular user's PIN number;
- initially storing in the central processor each user's file number and the algorithm and terminal number associated with that file number;
- verifying that a user entering his PIN number in a given terminal is authorized to use that given terminal when there is correspondence between the first number stored in that given terminal and a second number derived from the use in the algorithm of the terminal number stored in that given terminal and a user's PIN number entered into that given terminal;
- transmitting the user's file number stored in that given terminal to the central processor when the user is verified by that given terminal;
- generating a random number in the central processor when the user's file number is received by the central processor;
- using the generated random number and the algorithm and terminal number stored in the given terminal to generate a third number;
- utilizing the generated random number and the algorithm and terminal number associated with the user's file number received by the central processor to generate a fourth number in the central processor; and
- validating that the given terminal transmitting the user's file number is authorized to access that file number when there is correspondence between the third and fourth numbers.

6. The method of claim 5 wherein said initializing step includes the steps of:
- giving a terminal number to a personal terminal;
- assigning a file number for a specific file and a personal terminal having an assigned algorithm to a particular user;
- recording the associated file number, terminal number and assigned algorithm in a nonvolatile memory of the terminal;
- allowing the particular user to have a PIN number;
- initially entering the PIN number on a keyboard of the terminal;
- calculating the first number by using the particular user's entered PIN number and the terminal number of the terminal in the assigned algorithm; and
- recording the first number in the nonvolatile memory.

7. The method of claim 6 wherein said verifying step includes the steps of:
- activating the terminal by the user;
- identifying the file number of the file that the user wants to access;
- entering the PIN number of the user;
- computing the second number by using the user's entered PIN number and the terminal number of the terminal in the assigned algorithm; and
- comparing the first and second numbers for correspondence therebetween.

* * * * *